(12) United States Patent
Genders et al.

(10) Patent No.: US 6,712,946 B2
(45) Date of Patent: Mar. 30, 2004

(54) ELECTRODIALYSIS OF MULTIVALENT METAL SALTS

(75) Inventors: J. David Genders, Elma, NY (US); Dan Hartsough, Clarence, NY (US)

(73) Assignee: The Electrosynthesis Company, Inc., Lancaster, NY (US)

( * ) Notice: Subject to any disclaimer, the term of this patent is extended or adjusted under 35 U.S.C. 154(b) by 0 days.

(21) Appl. No.: 10/153,048

(22) Filed: May 21, 2002

(65) Prior Publication Data

US 2002/0189950 A1 Dec. 19, 2002

Related U.S. Application Data

(60) Provisional application No. 60/299,290, filed on Jun. 18, 2001.

(51) Int. Cl.[7] .............................................. B01P 61/44
(52) U.S. Cl. ........................ 204/518; 204/522; 204/529; 204/531; 435/136
(58) Field of Search ................................ 204/518, 522, 204/529, 531; 435/136

(56) References Cited

U.S. PATENT DOCUMENTS 4,818,409 A   4/1989   Puetter et al. .............. 210/638
4,828,993 A * 5/1989   Sridhar ........................ 435/136
5,268,079 A * 12/1993  Ochoa Gomez et al. . 204/182.4

OTHER PUBLICATIONS

Isolation and Purification of Iminodiancetic Acid From Its Sodium Salt by Electrodialysis Journal of Applied Electrochemistry 23 (1993) 56–59 Feb. 24, 1992; Revised Apr. 28, 1992 J.R. Ochoa G;, J. Santa–Olallag., A, de Diego Z., J.L. Martin R. Ercros I&D, Centro de Investigacion de Tres Cantos, Department de Quimica Organica, Ronda de Valdecarrizo, 23, Tres Cantos, 28760 Madrid, Spain.

* cited by examiner

Primary Examiner—Arun S. Phasge
(74) Attorney, Agent, or Firm—Howard M. Ellis

(57) ABSTRACT

A method for electrodialysis is conducted in a multi-compartment, preferably a four compartment, electrodialysis cell configuration wherein an inexpensive source of protons, preferably from a strong inorganic acid enables the conversion of multivalent metal salts into valuable acid products, such as 2-keto-L-gluconic acid, a vitamin C precursor, and useful by-products, like calcium chloride.

8 Claims, 1 Drawing Sheet

ELECTRODIALYSIS OF MULTIVALENT METAL SALTS

CROSS REFERENCE TO RELATED APPLICATION

This application claims the benefit of U.S. Provisional Application Serial No. 60/299,290, filed Jun. 18, 2001.

GOVERNMENT LICENSE RIGHTS

This invention was made with United States Government support under Cooperative Research Agreement No. 70NANB5H1138 awarded by the Advanced Technology Program of the National Institute of Standards and Technology. The United States Government has certain rights in the invention.

TECHNICAL FIELD

This invention relates generally to multi-compartment electrodialysis methods for recovery of acid values from metal salts, especially multivalent metal salts that form substantially insoluble precipitates (hydroxides or oxides) upon addition of base, such as calcium salts of gluconic acid derivatives. These inventors discovered that the use of an inexpensive acid as a source of protons, particularly in a four compartment configuration electrodialysis cell, allows the conversion of such multivalent metal salts into a desirable acid product and a soluble multivalent salt by-product.

BACKGROUND OF THE INVENTION

The recovery of acid values from multivalent metal salts by electrodialysis has not been practiced because the membranes of electrodialysis cells can be subject to fouling with insoluble hydroxide precipitates when multivalent metal salts are split into the acid and base components. Four compartment electrodialysis, also termed double decomposition or metathesis, is a useful technique for recovering the acid values from such salt streams. Metathesis has been used to recover iminodiacetic acid, a key intermediate in the production of glyphosate herbicides, from its sodium salt, but has not been applied to the recovery of valuable acids from multivalent metal salts. Also, the four compartment process has not been applied to the recovery of valuable gluconic acid derivatives, such as 2 Keto-L-gulonic acid, (a key intermediate in Vitamin C production) from multivalent metal salts of the acid.

In cases where the acid form of a multivalent metal salt is more valuable than the salt, it is desirable to convert the salt to the acid. Conventional methods for recovering the acid value from a salt have included precipitating the cation by addition of an acid such as sulfuric acid that forms an insoluble multivalent metal salt. Cation or anion exchange resins have also been used to exchange the multivalent cation for proton to produce the desired acid. However, in some cases these processes do not produce the acid in adequate purity or concentration, or are not economical. Salt splitting electrodialysis processes with bipolar membranes are useful for producing concentrated and purified acids from salts since the anion is transported across anion permeable membranes. However, salt splitting electrodialysis also forms the corresponding base from the salt, and hence the bipolar and/or cation membranes can foul with insoluble precipitates when the cation is a multivalent metal. Multi-compartment electrodialysis allows the recovery of acid values and avoids these potential fouling problems.

The requirement for the recovery of acid values from a multivalent metal salt can be demonstrated in the production of ascorbic acid from sugars via fermentation. The fermentation converts the sugar to a 2-keto-L-gulonic (hereinafter KLG) acid salt, which is a key intermediate in the production of ascorbic acid. KLG must be converted to the free acid form before chemical conversion to ascorbic acid. The fermentation cannot be run to form free KLG acid because KLG acid is a fairly strong organic acid (pKa=2.7). Therefore, aqueous solutions of KLG acid are too acidic to allow fermentation to proceed. A suitable base is added to the fermenter to maintain a near neutral pH and form a salt of KLG. In the case of the bacterium used to form KLG, the most suitable base is calcium hydroxide. KLG productivity, yield, titer, and cell viability are all reduced significantly when monovalent bases, such as sodium, potassium, or ammonium hydroxide are used to control pH during fermentation. Therefore, the preferred product of the fermentation is a solution of calcium KLG. A conventional approach to acidification of $CaKLG_2$ is to add sulfuric acid to equivalence, thereby forming KLG acid and calcium sulfate. Calcium sulfate is sparingly soluble, so calcium sulfate is filtered off and residual soluble calcium sulfate may be removed by cation and anion exchange steps. This process produces large amounts of calcium sulfate waste that must be landfilled for a fee, and has a relatively high capital equipment cost due to the need for cation and anion exchange and evaporation of large amounts of water from the relatively dilute broth.

Four compartment electrodialysis (metathesis) is an attractive alternative because it would produce concentrated and purified KLG acid directly from the fermentation broth and a soluble calcium salt by-product of potential economic value. Accordingly, four compartment electrodialysis methods have been developed to permit recovery of the acid value from a multivalent metal salt.

SUMMARY OF THE INVENTION

It is a principal object of this invention to provide a novel multi-compartment electrodialysis (metatheis) method for the recovery of acid values from multivalent cation salts that form insoluble precipitates upon addition of hydroxide.

It is a further object of this invention to provide a novel electrodialysis method for converting $CaKLG_2$ to concentrated and purified KLG acid and a soluble calcium salt by-product. These objectives can be met particularly well with a four compartment electrodialysis method comprising the steps of:

a) introducing a first feed solution into a first electrodialysis feed compartment, the feed solution comprising a multivalent metal salt in water, such as $CaKLG_2$;

b) introducing a second feed solution in a second electrodialysis feed compartment consisting of a strong acid solution in water, such as an aqueous solution of hydrochloric acid;

c) transporting an anion of the multivalent metal salt, such as the KLG anion in the first feed compartment across an anion exchange membrane and into an acid product compartment;

d) forming the corresponding acid product (KLG acid) in the acid product compartment by addition of proton from the second electrodialysis feed compartment solution adjacent to the KLG acid compartment. The proton from the strong acid solution in the second feed compartment is transported across a cation exchange membrane into the acid product compartment;

e) removing the multivalent metal cation, such as calcium from the first feed compartment by transporting across a cation exchange membrane and into the by-product calcium salt compartment, and f) forming the corresponding soluble calcium salt by-product, such as calcium chloride, by transporting the anion of the strong acid from the second feed compartment across an anion exchange membrane into the by-product calcium salt compartment.

In this embodiment, the multivalent metal salt is converted into a more valuable acid product and a soluble salt of the multivalent cation as a by-product. This is accomplished by providing a strong acid as a second electrodialysis feed stream that provides protons to form the desired acid product and anions to form the soluble multivalent metal salt by-product. The by-product may be potentially valuable product equal to or greater than that of the added strong acid, so that the by-product enhances the overall economic advantage of the metathesis process. Examples of such co-products include calcium chloride and calcium nitrate.

BRIEF DESCRIPTION OF THE DRAWING

The one FIGURE is a diagrammatic view of a representative four compartment electrodialysis cell useful in practicing the invention, for converting a multivalent metal cation salt, such as $CaKLG_2$ to the corresponding valuable acid product (KLG acid) and a soluble calcium salt by-product, e.g., calcium chloride.

DESCRIPTION OF THE PREFERRED EMBODIMENT

Figure 1:
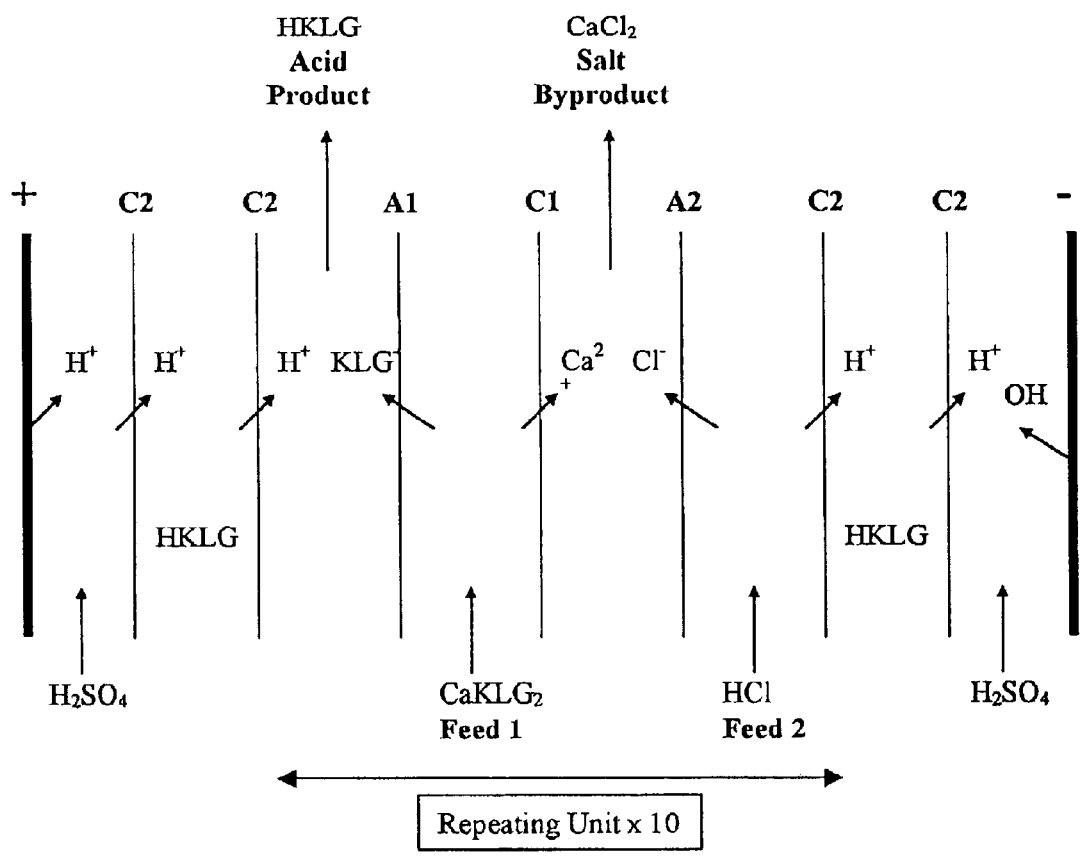

In practicing the present invention, a first feed solution is prepared comprising, for instance, a multivalent metal cation salt in water, such as a fermentation broth containing calcium KLG. Any microorganism capable of converting carbohydrates to KLG in the presence of the multivalent cations introduced into the broth during fermentation to maintain a pH suitable for ongoing KLG production may be used. If the feed is a fermentation broth, for example, optional pretreatment steps for the metathesis feed solution may comprise any or all of the following: (i) filtration to remove cells and other particulates; (ii) nanofiltration and/or diafiltration to remove sugars, nutrients, proteins, color bodies, and other membrane foulants, as well as inorganic salts; (iii) carbon treatment to adsorb color bodies and other organic impurities; (iv) anion exchange to remove impurities which may foul the ED membranes; (v) treatment with polymeric adsorbent resins to remove impurities, and (vi) concentration/purification by standard elecrodialysis to concentrate and purify, e.c., the calcium salt.

The feed solution may be introduced into the four compartment electrodialysis stack represented in FIG. 1. In the metathesis process, a calcium salt, such as calcium KLG ($CaKLG_2$) is converted to purified and concentrated acid, such as HKLG acid and a soluble calcium salt by-product, such as calcium chloride by introducing the $CaKLG_2$ into Feed 1 compartment and Hcl solution into Feed 2. The KLG anion is separated from neutral sugars. The four compartment electrodialysis cell stack (FIG. 1) is further comprised of at least one set of cation and anion (two cation and two anion) membranes (C1 and C2) and (A1 and A2). The four compartment electrodialysis stack consists of at least one of these four compartment units disposed between an anode (+) and a cathode (−).

The anion exchange membranes (A1–A2) may be strongly, mildly, or weakly basic and are comprised of quaternary or tertiary ammonium groups. The anion membranes must be stable and should possess low resistance to anion transport. Therefore, it may be preferable to use a more open anion exchange membrane for the transport of large anions, such as KLG (Anion membrane A1 in FIG. 1). Furthermore, anion exchange membrane A1 should prevent transport of neutral sugars from the fermentation broth. Although virtually any anion exchange membrane can be used as anion membrane A2, so long as it is stable and has a low resistance to anion transport, it may be preferable to use an acid blocker anion membrane, such as one available under the trademark Neosepta® ACM in order to minimize diffusion of the strong acid feed (Feed 2) into the multivalent metal salt by-product stream.

The cation exchange membranes (C1–C2) may be of weakly acidic (e.g. carboxylic acid type), moderately acidic (e.g. phosphonic acid type), or strongly acidic (sulfonic acid cation exchange groups). The cation membranes should be stable and have a low resistance in the multivalent metal salt solution to be electrodialyzed. Therefore, it may be preferable to use a more open cation exchange membrane for the transport of larger multivalent metal cations, such as calcium (Cation membrane C1 in FIG. 1), and may include perfluorinated membranes, such as DuPont's Nafion® or any non-perfluorinated cation exchange membrane such as Neosepta CMX-SB. It will be understood that several of the four compartment units comprised of cation and anion membranes can be stacked together in an electrodialysis stack with a single pair of electrodes at the outer ends. In FIG. 1, one repeating unit consists of C1 and A1 cation and anion exchange membranes for transport of $CaKLG_2$, and C2 and A2 cation and anion exchange membranes for transport of hydrochloric acid. Hence, the electrodialysis cells of the invention may comprise from 1 to 10 units, or more.

Under the influence of the potential field, the chloride anion associated with the strong acid feed (Feed 2 in FIG. 1) migrates across anion membrane 2 (A2) and combines with the multivalent metal cation from Feed 1 which migrates across cation membrane 1 (C1) into the by-product multivalent metal salt compartment, thereby forming the soluble multivalent metal salt by-product, i.e., calcium chloride. Protons from Feed 2 will migrate towards the cathode (−) across cation membrane 2, C2, into the acid product compartment where they combine with multivalent metal salt anions, such as KLG anions which migrate towards the anode across anion membrane 1, A1, thereby forming a purified and concentrated solution of an acid, such as KLG acid and leaving behind neutral sugars in the Feed 1 solution. The Feed 1 solution may be nearly completely depleted.

In the example shown in FIG. 1, a concentrated and purified solution of KLG acid suitable for further processing to form ascorbic acid is formed, along with a by-product calcium chloride suitable for recovery and sale.

The metathesis stacks in FIG. 1 include an anode and cathode rinsed with an electrolyte. The anode should be stable to the electrolysis conditions and may include carbons, such as graphite, lead dioxide, noble metals or alloys of Pt, Pd, Ir, Au, Ru, etc., noble metals or alloys deposited on a valve metal, such as Ti or Ta, etc. Generally, the anode (+) reaction will be the oxidation of water to produce hydrogen and protons according to reaction 1:

$$2H_2O \rightarrow O_2 + 4H^+ + 4e^- \tag{1}$$

The cathode should be stable and may include noble metals and alloys, nickel, steels, etc. Generally, the cathode reaction is the production of hydrogen and hydroxide from the reduction of water according to reaction 2:

$$2H_2O + 2e^- \rightarrow H_2 + 2OH^- \qquad (2)$$

Because multivalent cations are present in the process, the anolyte and catholyte streams are preferably a solution of an inert strong acid, such as sulfuric acid or nitric acid, to prevent the formation of insoluble hydroxides in the electrode rinse solutions. Preferably, for the four compartment configuration, the electrode rinse streams are tied together outside the cell (not shown), and are bounded by cation membranes adjacent to acid product compartments so that only protons are transported into and out of the rinse streams, and the overall composition of the rinse stream is not changed.

The metathesis cell stack of FIG. 1 may be operated at a unit cell voltage of about 0.1–10 volts per set of membranes and more preferably 0.5–5 volts per set. The temperature range should be between 5 and 100° C., and more preferably, from 20 to 60° C. Higher temperatures may cause degradation of some of the membranes. The process may be run continuously or in a batch mode.

From the above detailed description, it is possible that impurities in the multivalent metal salt feed solution may foul the membranes resulting in a loss of performance. The cell and membranes may be cleaned in place (in the ED stack) with acidic solutions, including nitric, hydrochloric or other mineral acids to remove any multivalent metal precipitates, and to remove organic foulants from membranes. Basic wash solutions may also be employed, preferably after an acid wash, to remove organic foulants from membranes. Other wash solutions, such as percarboxylic acids, non-ionic or ionic detergents or alcohols are possible, so long as they effect the necessary membrane cleaning and do not degrade membrane performance. The clean in place (CIP) procedure may include elevated temperature of the wash solution so long as the membranes are stable to the temperatures.

The invention will be more clearly perceived and better understood from the following example.

EXAMPLE
Recovery of KLG Acid is Demonstrated from Calcium KLG in a Four Compartment Electrodialysis Stack Wherein:

A fermentation broth containing 12.7% KLG as $Ca(KLG)_2$ was produced, microfiltered to remove cells, and treated with activated carbon to remove color and membrane foulants. Nine 25L batches of this broth at pH 5.5 were passed through the first feed compartment of a FuMA-Tech™ ED100 four compartment laboratory electrodialysis cell fitted with 10 sets of Neosepta CMX-SB cation and Neosepta AXE-01 anion membranes for transport of $CaKLG_2$, and 10 sets of Neosepta CMX-SB/Neosepta AXE-01 cation and anion membranes for transport of HCl. The metathesis cell cell corresponds to that of FIG. 1. The metathesis cell unit area is 100 cm² active area per membrane, and the intermembrane gap is 0.6 mm. Aqueous HCl solution at a constant concentration of approximately 0.4 molar was passed through the second feed compartment. Concentrated HCl was added to maintain the strength of this feed. The acid compartment was initially filled with 13.4% KLG acid product from a previous electrodialysis and the by-product salt compartment with a solution containing approximately 1% $CaCl_2$. Water was continually added to the byproduct salt compartment to maintain this concentration of $CaCl_2$ during electrodialysis.

The first feed was recycled through the stack and operated at a controlled voltage of 2.0 Volts per cell and a temperature of 55° C. until 95% of the KLG was removed. The product KLG acid concentration was 26.9%. The total electrodialysis time was 70.3 hours. The cell was washed with 20% nitric acid at 55° C. for 30 minutes between batches. The average current density was 83.6 mA cm$^{-2}$. The average current efficiency for KLG transport was 76%. The average current efficiency for calcium transport was 90%. No calcium deposits were found in the cell after the experiment.

We claim:

1. A method for preparing 2-keto-L-gulonic acid in a multi-compartment electrodialysis cell, which comprises the steps of:
   (i) introducing a first feed solution into a first feed compartment of said electrodialysis cell, said first feed solution comprising a multivalent metal salt of a gluconic acid derivative from a fermentation process;
   (ii) introducing a second feed solution into a second feed compartment of said electrodialysis cell, said second feed solution comprising an acid suitable for providing protons and anions that form soluble salt by-products with the multivalent metal from said multivalent metal salt of the gluconic acid derivative;
   (iii) transporting anions from said metal salt of the gluconic acid derivative in said first feed compartment across an anion exchange membrane and into an acid product compartment;
   (iv) forming the 2-keto-L-gulonic acid from the anions of said metal salt of the gluconic acid derivative in said acid product compartment by the introduction of said protons from across a cation exchange membrane in the second feed compartment, and
   (v) forming said soluble salt by-product by transporting multivalent cations from said multivalent metal salt of the gluconic acid derivative in the first feed compartment across a cation exchange membrane and with anions of the acid transported across an anion exchange membrane from said second feed compartment.

2. The method of claim 1 wherein the electrodialysis cell is a four compartment electrodialysis cell.

3. The method of claim 2 wherein the multivalent cation is calcium or magnesium.

4. The method of claim 3 wherein the salt by-product is calcium chloride.

5. The method of claim 1 wherein the acid is a strong acid.

6. The method of claim 5 wherein the strong acid is an inorganic acid.

7. The method of claim 6 wherein the inorganic acid is a member selected from the group consisting of nitric acid, hydrochloric acid and hydrobromic acid.

8. The method of claim 1, wherein said metal salt of a gluconic acid derivative is a calcium salt of 2-keto-L-gulonic acid.

* * * * *